United States Patent
Xu

(10) Patent No.: US 12,022,305 B2
(45) Date of Patent: Jun. 25, 2024

(54) MEASURING METHOD AND DEVICE IN DC OPERATION

(71) Applicant: SPREADTRUM COMMUNICATIONS (SHANGHAI) CO., LTD., Shanghai (CN)

(72) Inventor: Min Xu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 435 days.

(21) Appl. No.: 17/417,021

(22) PCT Filed: Nov. 12, 2019

(86) PCT No.: PCT/CN2019/117504
§ 371 (c)(1),
(2) Date: Jun. 21, 2021

(87) PCT Pub. No.: WO2020/125276
PCT Pub. Date: Jun. 25, 2020

(65) Prior Publication Data
US 2022/0078646 A1    Mar. 10, 2022

(30) Foreign Application Priority Data

Dec. 21, 2018  (CN) .......................... 201811574827.8

(51) Int. Cl.
*H04W 24/08*  (2009.01)
*H04W 24/10*  (2009.01)
*H04W 76/15*  (2018.01)

(52) U.S. Cl.
CPC ........... *H04W 24/08* (2013.01); *H04W 24/10* (2013.01); *H04W 76/15* (2018.02)

(58) Field of Classification Search
None
See application file for complete search history.

(56) References Cited

U.S. PATENT DOCUMENTS

2018/0227812 A1*  8/2018  Nagasaka ............. H04W 24/10
2018/0270682 A1    9/2018  Zacharias et al.
(Continued)

FOREIGN PATENT DOCUMENTS

CN    103563421 A    2/2014
CN    105103589 A    11/2015
(Continued)

OTHER PUBLICATIONS

First Office Action for Chinese Patent Application No. 201811574827.8.
(Continued)

*Primary Examiner* — Rebecca E Song
(74) *Attorney, Agent, or Firm* — Womble Bond Dickinson (US) LLP

(57) ABSTRACT

The present disclosure relates to a measuring method in a dual connectivity (DC) operation. The method is applied to a UE in a non-connected state, and comprises: determining DC indication information based on the measurement result; and reporting the DC indication information to a network by means of a request message. The UE in the non-connected state can determine and report the DC indication information based on the measurement result.

18 Claims, 13 Drawing Sheets

(56) References Cited

U.S. PATENT DOCUMENTS

| | | | |
|---|---|---|---|
| 2019/0306739 A1* | 10/2019 | Kim | H04L 5/0096 |
| 2020/0022095 A1* | 1/2020 | Kim | H04W 48/18 |
| 2020/0029239 A1* | 1/2020 | Chen | H04W 76/19 |
| 2020/0245388 A1* | 7/2020 | Byun | H04W 76/27 |
| 2021/0168893 A1* | 6/2021 | Ai | H04W 76/27 |

FOREIGN PATENT DOCUMENTS

| | | | |
|---|---|---|---|
| CN | 108282836 A | 7/2018 | |
| CN | 108632851 A | 10/2018 | |
| CN | 108924949 A | 11/2018 | |
| WO | WO-2016106725 A1 * | 7/2016 | H04W 4/22 |
| WO | 2020/197054 A1 | 10/2020 | |

OTHER PUBLICATIONS

Second Office Action for Chinese Patent Application No. 201811574827.8.

International Search Report mailed on Jan. 19, 2020 for International application No. PCT/CN2019/117504.

Interdigital Inc: "Dual Connectivity Configuration in INACTIVE for MR-DC", 3GPP TSG-RAN WG2 Meeting #103, R2-1811461, Gothenburg, Sweden, Aug. 20-24, 2018 (5 Pages).

Vivo "Configuration of INACTIVE state for MR-DC" 3GPP TSG-RAN WG2 Meeting #106 R2-1905824, Reno, USA, May 13-17, 2019 (4 Pages).

* cited by examiner

MEASURING METHOD AND DEVICE IN DC OPERATION

CROSS-REFERENCE TO RELATED APPLICATION

This application is a National Stage of International Application No. PCT/CN2019/117504 filed on Nov. 12, 2019, the content of which is incorporated herein by reference in entirety.

TECHNICAL FIELD

The present disclosure relates to the technical field of communications, and more particularly to a measuring method and device in DC operation.

BACKGROUND

In 3GPP New Radio (NR), UE (User Equipment) has three states for its radio interface: an idle state (RRC_IDLE), an inactive state (RRC_INACTIVE), and a connected state (RRC_CONNECTED), wherein the RRC is short for radio resource control.

SUMMARY

In view of this, the present disclosure provides a measuring method and device in DC operation.

Based on an aspect of the present disclosure, there is provided a measuring method in dual connectivity (DC) operation. The method is applied to UE in a non-connected state. The method includes:
  determining DC indication information based on a measurement result; and
  reporting the DC indication information to a network side through a request message.

Based on another aspect of the present disclosure, there is provided a measuring method in dual connectivity (DC) operation, which includes:
  receiving a request message transmitted by UE; and
  obtaining DC indication information based on the request message.

BRIEF DESCRIPTION OF THE DRAWINGS

The accompanying drawings, which are incorporated in and constitute a part of the specification, illustrate the exemplary embodiments, features and aspects of the present disclosure and are used to explain the principle of the present disclosure.

DETAILED DESCRIPTION

Figure 1:
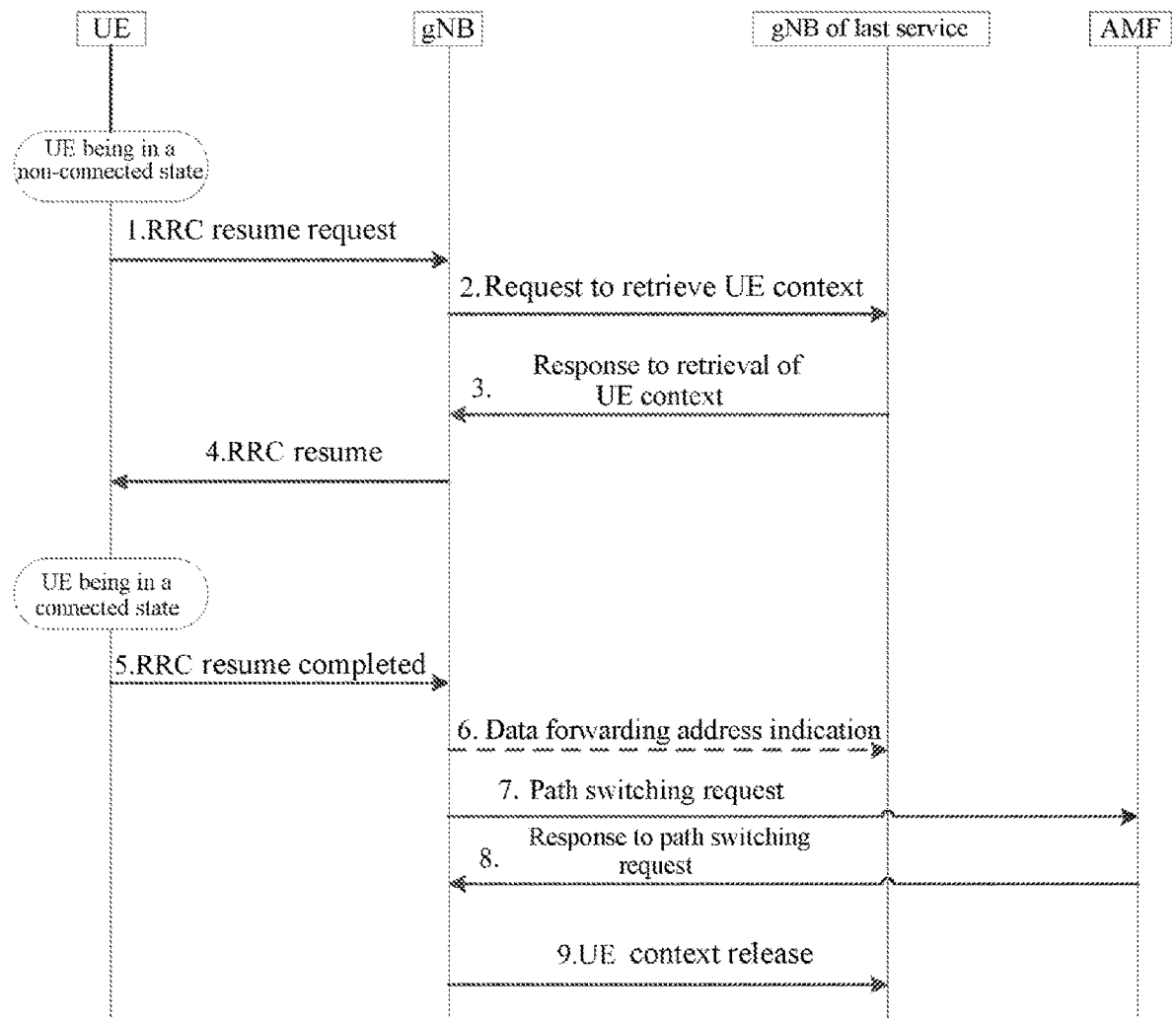
FIG. 1 illustrates a flow chart of migration of UE from a non-connected state to a connected state.

Various exemplary embodiments, features and aspects of the present disclosure are described in detail below with reference to the accompanying drawings. Reference numerals in the drawings refer to elements with same or similar functions. Although various aspects of the embodiments are illustrated in the drawings, the drawings are not necessarily drawn to scale, unless otherwise specified.

The term "exemplary" used exclusively herein means "using as an example and an embodiment or being illustrative". Any embodiment described herein as "exemplary" should not be construed as preferred or advantageous over other embodiments.

Furthermore, for a better description of the present disclosure, numerous specific details are given in the following detailed description. Those skilled in the art should understand that the present disclosure may equally be practiced without certain specific details. In some examples, methods, means, elements and circuits that are well known to those skilled in the art are not described in detail, in order to highlight the gist of the present disclosure.

To solve the above technical problems, the present disclosure provides a measuring method in dual connectivity (DC) operation.

UE in the idle state is not connected with a base station, and only needs to regularly initiate location update, cell selection and re-selection procedures, receiving paging, etc. UE in the connected state is connected with a network that will configure UE radio bearer (RB), a physical layer, and other such configurations, including dual connectivity (DC) operation (in a co-frequency or hetero-frequency scenario where at least two cells are controlled by different gNBs). The network may schedule uplink and downlink data for the UE. A base station does not need to be notified of the movement of UE in the inactive state within a certain range of RAN Notification Area (RNA), and the UE may reserve certain configurations. At present, the UE may reserve configurations, such as Packet Data Convergence Protocol/Service Data Adaptation Protocol (PDCP SDAP), and some low-layer configurations of a Primary Cell (Pcell), but may not reserve lower-layer Secondary Cell Group (SCG) configuration, where the SCG is composed of PScell and zero or multiple secondary cells (SCell). If the network needs to schedule the UL or the UE needs to transmit data, then it is necessary to migrate the UE to the connected state and resume the reserved configuration for data transmission. The process is shown in FIG. 1.

If a target base station can obtain the context of UE from an original serving base station, as shown in FIG. 1, the PCell configuration of the UE may be resumed quickly in an RRC Resume message, and yet the SCG configuration cannot be resumed. The reason for this is that the network, at this point, has no SCG-related measurement result information from the UE, and it is impossible to determine whether the UE has left the Primary SCG Cell (PSCell) or obtained the measurement results of other SCells, and whether SCG parameters previously configured in the connected state can be used directly or whether parameters can be configured based on the measurement results of the SCells, resulting in failing to quickly complete DC configuration. Moreover, the quality of a cell where the UE in the inactive state is resided is higher than a particular threshold, which may cause to fail to start co-frequency or hetero-frequency measurement.

Figure 2:
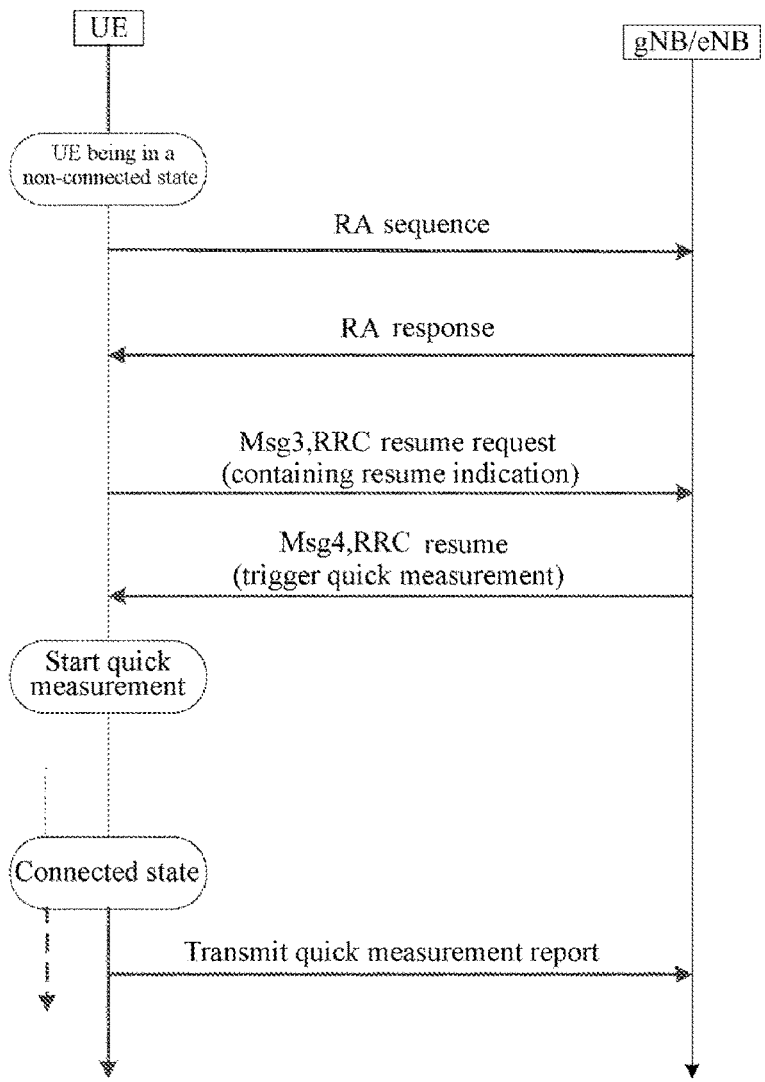
FIG. 2 illustrates a flow chart of quick measuring method.

The existing quick measurement is shown in FIG. 2. A carrier to be measured quickly may be carried in the RRC resume message. Upon reception of the RRC resume message, the UE is started to perform the hetero-frequency measurement, and reports a quick measurement report after entering the connected state.

In conclusion, the network side cannot configure or resume the DC operation of the UE quickly.

Figure 3:
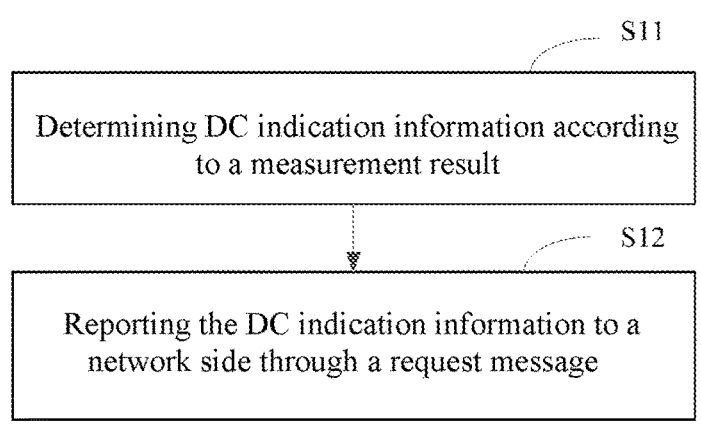
FIG. 3 illustrates a flow chart of a measuring method in dual connectivity (DC) operation based on an embodiment of the present disclosure.

FIG. 3 illustrates a flow chart of a measuring method in dual connectivity (DC) operation based on an embodiment of the present disclosure. The method may be applied to UE in a non-connected (inactive or idle) state. After the UE migrates from the connected state to the non-connected state (such as inactive state) and before it enters the connected state again, the UE may perform measurement on a non-primary cell or frequency point to obtain a measurement result. The method shown in FIG. 3 is used to report DC indication information, so that a network side can perform DC configuration on the UE, where the network side may be a 5G base station gNB.

As shown in FIG. 3, the method may include:

S11: determining DC indication information based on a measurement result.

The measurement result may refer to the measurement result of the cell or the frequency point measured by the UE in the non-connected state. The UE may periodically perform measurement on the cell or frequency point to obtain the measurement result. The periodic measurement result may be saved either all or in an overlaid manner that an original measurement result is overlaid with a new measurement result. The present disclosure does not limit the specific way of saving the measurement result of the UE.

The non-connected state may refer to the UE being in an inactive or idle state. The cell may include a PSCell, a neighbor cell of the PSCell or the like. The frequency point may include frequency points of the neighbor cell of the PSCell or frequency points configured by the network side, and this is not limited in the present disclosure, as long as the measurement result can be used for determining the DC indication information. The PSCell and the PCell may be PSCell and PCell in the previous connected state of the UE, or the PCell may be a serving cell after the UE carries out cell selection/reselection. The PSCell may be notified in advance by the network side.

The DC indication information may be information for indicating to the network side whether the DC operation of the UE can be configured. For example, the DC indication information may include an indication of resuming DC configuration.

The UE may determine the DC indication information based on the measurement result. For example, the UE may determine the DC indication information based on the latest measurement result (i.e. the latest measurement result from an RRC Resume Request message in time). If the cell signal quality of the PSCell in the measurement result is equal to or higher than a threshold value, that is, the PSCell still satisfies the conditions of the PSCell in the DC configuration, then the UE may determine the DC indication information as an indication that the PSCell satisfies the threshold; or if the cell signal quality of the PSCell in the measurement result is lower than the threshold value, that is, the PSCell does not satisfy the conditions of the PSCell in the DC configuration, then the UE may determine the DC indication information as an indication that the PSCell does not satisfy the threshold or the DC configuration cannot be resumed, wherein the threshold value may be a PSCell threshold preset by the network side.

S12: reporting the DC indication information to the network side through a request message.

The request message may be an RRC setup request message RRCSetupRequest or an RRC resume request message. The RRC resume request message may include an RRCResumeRequest message or an RRCResumeRequest1 message.

If the UE is in an inactive state, and when the UE needs to migrate from the inactive state to the connected state, a random access RACH procedure is initiated, and the DC indication information may be reported to the network side through the RRCResumeRequest1 message or the RRCResumeRequest message (the RRC resume request shown in FIG. 1). For example, the DC indication information may be carried (contained) in the RRCResumeRequest or RRCResumeRequest1 message. As a result, the network side performs the DC configuration based on the DC indication information. For example, the UE may report to the network side that the PSCell satisfies the threshold, and the network side may resume the previous DC configuration of the UE directly.

If the UE is in an idle state, and when the UE needs to enter the connected state, the DC indication information may be reported to the network side through the RRCSetupRequest message, so that the network side performs the DC configuration based on the DC indication information. For example, the UE may report the indication of resuming DC configuration to the network side, and the network side may resume the previous DC configuration of the UE directly.

Optionally, the DC indication information may be carried by 1 bit in the RRC setup request message or the RRC resume request message.

It should be noted that if the UE does not obtain valid measurement result (for example, does not obtain the PSCell measurement result satisfying the PSCell threshold or the SCG cell threshold) before initiating the request message, or the network does not configure that the UE reports the DC indication information in the request message, then S11 may be omitted, and in S12 the message may be the existing request message. For example, for the UE in the inactive state, the RRCResumeRequest or the RRCResumeRequest1 as shown in FIG. 1 may be transmitted at this point. The UE may perform S17 and subsequent steps.

The UE in the non-connected state can determine and report based on the DC indication information based on the measurement result. Quick measurement and report are realized through the measuring method in dual connectivity (DC) operation based on the embodiments of the present disclosure. Moreover, when the DC indication information indicates that DC configuration can be resumed, the network side may resume the previous DC configuration of the UE directly and resume the DC configuration of the UE quickly.

Optionally, the DC indication information includes one of the following: an indication of resuming a secondary cell group (SCG), an indication of resuming DC configuration, an indication that a primary SCG cell (PSCell) satisfies a PSCell threshold, an indication that the PSCell does not satisfy the PSCell threshold, a DC indication being null, an indication that the PSCell satisfies an SCG cell threshold, and an indication that an SCG cell satisfies the threshold.

For example, by taking the UE in the inactive state as an example, the 1 bit in the RRCResumeRequest or RRCResumeRequest1 message may be predetermined as 1 to represent the indication of resuming the secondary cell group (SCG), the indication that the primary SCG cell (PSCell) satisfies the PSCell threshold, the indication of resuming DC configuration, and the indication that the SCG cell satisfies the threshold; the 1 bit in the RRCResumeRequest message may be predetermined as 0 to represent the indication that the PSCell does not satisfy the PSCell threshold; and the 1 bit in the RRC resume request message may be predetermined as null to represent the DC indication being null. If the UE determines the DC indication information as an indication that the primary SCG cell (PSCell) satisfies the PSCell threshold, the 1 bit in the RRC resume request message may be set as 1, and the RRC resume request message is transmitted to the network side to report the DC indication.

Figure 4:
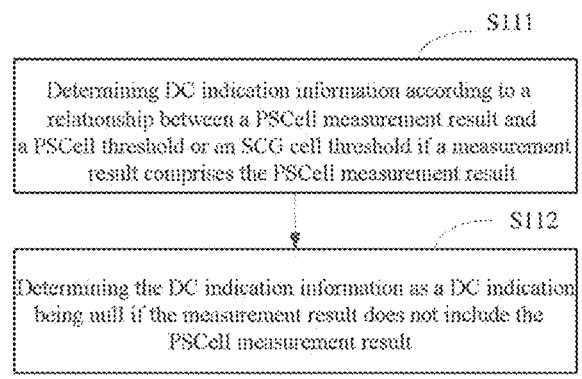
FIG. 4 illustrates a flow chart of S11 based on an embodiment of the present disclosure.

FIG. 4 illustrates a flow chart of S11 based on an embodiment of the present disclosure. As shown in FIG. 4, optionally, S11 may include:

S111: determining the DC indication information based on a relationship between a PSCell measurement result and the PSCell threshold or the SCG cell threshold if the measurement result includes the PSCell measurement result; and S112: determining the DC indication information as the DC indication being null if the measurement result does not include the PSCell measurement result.

The PSCell measurement result may refer to the measurement result of the PSCell measured by the UE, such as signal quality and cell load of the PSCell. The PSCell may be the PSCell in the previous (last) DC state. The PSCell threshold and the SCG cell threshold may be pre-configured by the network side.

The UE may judge whether the measurement result includes the PSCell measurement result. If the measurement result includes the PSCell measurement result, the DC indication information may be determined based on the relationship between the PSCell measurement result and the PSCell threshold or the SCG cell threshold. For example, if the PSCell measurement result satisfies the PSCell threshold, the DC indication information may be determined as an indication of resuming DC; and if the measurement result does not include the PSCell measurement result, the DC indication information may be determined as the DC indication being null.

Figure 5:
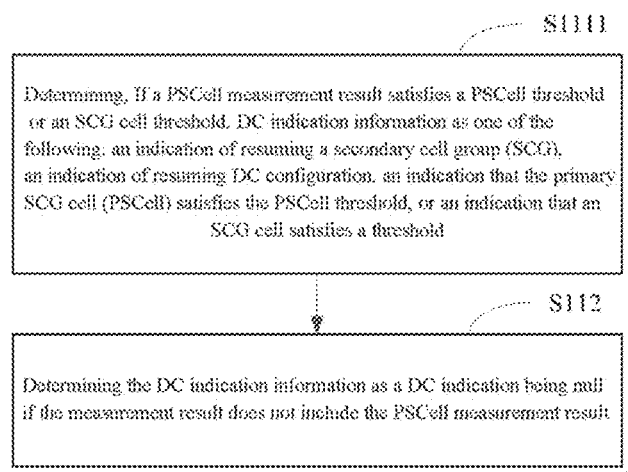
FIG. 5 illustrates a flow chart of S111 based on an embodiment of the present disclosure.

FIG. 5 illustrates a flow chart of S111 based on an embodiment of the present disclosure. As shown in FIG. 5, optionally, S111 may include:

S1111: if the PSCell measurement result satisfies the PSCell threshold or the SCG cell threshold, the DC indication information is determined as one of the following: an indication of resuming a secondary cell group (SCG), an indication of resuming DC configuration, an indication that the primary SCG cell (PSCell) satisfies the PSCell threshold, or an indication that an SCG cell satisfies the threshold.

The UE may judge the relationship between the PSCell measurement result and the PSCell threshold or the SCG cell threshold. If the PSCell measurement result satisfies the PSCell threshold or the SCG cell threshold, the DC indication information may be determined, for example, the DC indication information may be determined as the indication of resuming the secondary cell group (SCG).

The PSCell measurement result satisfies the PSCell threshold or the SCG cell threshold, which may indicate that the previous PSCell of the UE may continue to serve as PSCell. Therefore, the DC indication information may be determined as one of the indication of resuming SCG, the indication of resuming the DC configuration, the indication that the PSCell satisfies the PSCell threshold, and the indication that the SCG cell satisfies the threshold so to notify the network side of resuming the previous DC configuration of the UE.

It should be noted that if the SCG of the UE only contains the PSCell, then the indication that the SCG cell satisfies the threshold may refer to that the PSCell satisfies the SCG cell threshold. At this time, the UE may determine the DC indication information as an indication that the SCG cell satisfies the threshold if the PSCell satisfies the SCG cell threshold.

If the SCG of the UE contains the PSCell and a plurality of SCells, then the indication that the SCG cell satisfies the threshold may refer to that the PSCell satisfies the SCG cell threshold and the plurality of SCells also satisfy the SCG cell threshold. At this time, the UE may determine the DC indication information as an indication that the SCG cell satisfies the threshold if the PSCell and the plurality of SCells both satisfy the SCG cell threshold.

Optionally, if the PSCell measurement result does not satisfy the PSCell threshold, then the UE may determine the DC indication information as an indication that the PSCell does not satisfy the threshold, so as to notify the network side that the previous PSCell of the UE does not satisfy the conditions so that it cannot continue to serve as PSCell.

Figure 6:
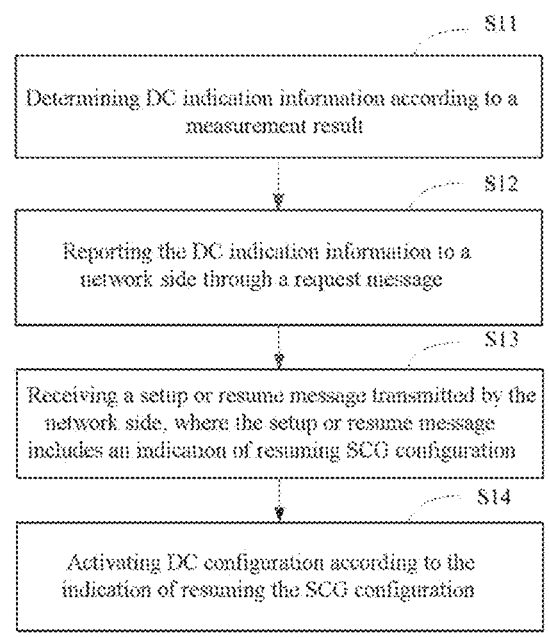
FIG. 6 illustrates a flow chart of the measuring method in dual connectivity (DC) operation based on an embodiment of the present disclosure.

FIG. 6 illustrates a flow chart of the measuring method in dual connectivity (DC) operation based on an embodiment of the present disclosure. As shown in FIG. 6, optionally, the method may further include:

S13: receiving an RRC setup or resume message transmitted by the network side, where the RRC setup or resume message includes an indication of resuming SCG configuration; and the RRC setup or resume message may be an RRCResume message or an RRCSetup message.

S14: activating DC configuration based on the indication of resuming the SCG configuration.

After transmitting the RRC setup or resume message to the network side, the UE may receive the RRC setup or resume message including the indication of resuming the SCG configuration, transmitted by the network side if the DC indication information in the RRC setup or resume message is the indication of resuming the SCG or the indication that the PSCell satisfies the PSCell threshold, etc. The RRC resume message may be an RRCResume message shown in FIG. 1. The UE may activate the DC configuration based on the indication of resuming the SCG configuration.

Figure 7:
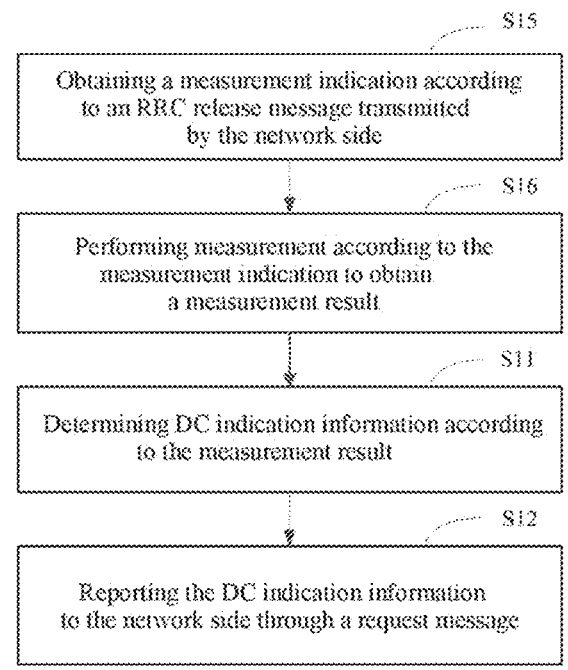
FIG. 7 illustrates a flow chart of the measuring method in dual connectivity (DC) operations based on an embodiment of the present disclosure.

FIG. 7 illustrates a flow chart of the measuring method in dual connectivity (DC) operation based on an embodiment of the present disclosure. As shown in FIG. 7, Optionally, the method may further include:

S15: obtaining a measurement indication based on an RRC release message transmitted by the network side; and S16: performing measurement based on the measurement indication to obtain a measurement result.

The RRC release message may be received by the UE from the network side when the UE migrates from the connected state to the non-connected state. The measurement indication may be carried in the RRC release message. When the UE is in the non-connected state, the UE may perform measurement based on the measurement indication obtained from the RRC release message transmitted by the network side, to obtain the measurement result.

Optionally, S16 may include: starting co-frequency and/or hetero-frequency measurement based on the measurement indication to obtain the measurement result when the UE may initiate a random access procedure request so as to enter the connected state.

As shown in FIG. 1 and FIG. 2, S16 may be executed before the UE transmits an Msg 3 request message, for example, may be executed between transmitting an RA sequence and transmitting Msg 3; or may be executed before the UE transmits a complete message, for example, may be executed between transmitting the RA sequence and transmitting the complete message, or may be executed when the UE migrates to the non-connected state.

The present disclosure does not limit the execution timing for S16 (measurement timing for UE), as long as the DC indication information can be reported in the RRC request message.

At present, when the UE is in the non-connected state, only one cell is selected for residence purposes, and this cell may be a PCell in the connected state or another cell. When the quality of this cell is higher than a certain threshold configured by the network side, the UE may not perform measurement on other cells of the co-frequency or hetero-frequency, that is, the UE only maintains the information and quality of the currently residing cell. In order to enable the UE to report the DC indication information in the request message, the UE is required to have a capability to maintain the measurement results of other cells (including the PSCell) than the currently residing cell, and further the trigger conditions for cell reselection measurement of the UE should be modified as follows: if the PSCell and the PCell have different frequency points or the cells under original MN and SN have different frequency points, it is necessary to maintain the suitable cell of two frequency points (frequency points of PCell and PSCell cells); and if the PSCell and PCell have the same frequency, the original PSCell still needs to be measured, that is, no matter whether the PCell and PSCell of the UE have the co-frequency or hetero-frequency, the PSCell needs to be measured. Based on the present disclosure, the measurement indication is transmitted to the UE through the network side, so that the UE needs to measure relevant frequency point cells based on the obtained measurement indication and to record relevant measurement results, thereby realizing the above modified trigger conditions of the cell reselection measurement of the UE and also ensuring that the UE can report the DC indication information in the request message.

Optionally, the measurement indication may include a first measurement indication and/or a second measurement indication;

The first measurement indication may comprise one or more of the following: an indication of reserving SCG configuration, an indication of reserving secondary cell (SCell) configuration, a PSCell threshold, an SCell threshold, and an SCG cell threshold. For example, the first measurement indication may include the indication of measuring the PSCell and the PSCell threshold or the SCG cell threshold. The UE may obtain, based on the measurement indication, the measurement result of the PSCell, such as signal quality of the PSCell, signal quality of one or more beams of the PSCell, a cell load, etc.

The second measurement indication may include a measurement frequency point list and/or a frequency point measurement threshold.

Optionally, the measurement frequency point list and/or the frequency point measurement threshold may be that configured in measurement configuration when the UE is in the connected state, that is, the measurement information configured when the UE is in the connected state may be reserved; or the measurement frequency point list and the frequency point measurement threshold may be those newly configured by the network side.

It should be noted that all the measurement results corresponding to the measurement frequency point list may be reported to the network side if the second measurement indication only contains the measurement frequency point list.

Optionally, the first measurement indication and the second measurement indication may further include threshold offset information.

The UE may obtain a measurement target cell based on the measurement frequency point list. For example, the UE only measures the cell signal quality on the frequency point indicated by the measurement frequency point list in the second measurement indication. The measured cell signal quality plus the offset may be compared with the frequency point measurement threshold. If the measured cell signal quality plus the offset satisfies the frequency point measurement threshold, such as higher than or equal to the frequency point measurement threshold, then the measurement result may be reported to the network side. By setting the offset, it can be ensured that the target cell satisfying the measurement conditions is obtained based on network requirements.

Figure 8:
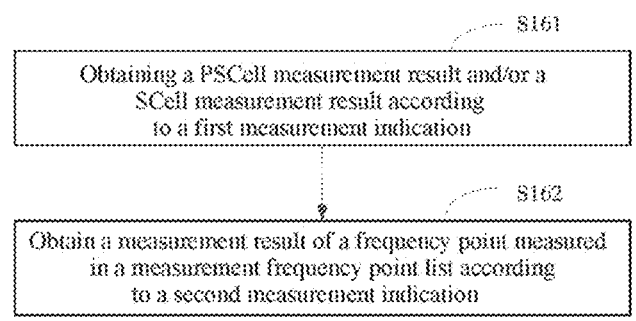
FIG. 8 illustrates a flow chart of S16 based on an embodiment of the present disclosure.

FIG. 8 illustrates a flow chart of S16 based on an embodiment of the present disclosure. As shown in FIG. 8, optionally, S16 may include:

S161: obtaining a PSCell measurement result and/or an SCell measurement result based on a first measurement indication; and/or S162: obtaining a measurement result of a frequency point measured in the measurement frequency point list based on a second measurement indication.

The measurement indication transmitted by the network side to the UE may include the first measurement indication and/or the second measurement indication, and thus the UE may obtain the PSCell measurement result and/or the Scell measurement result based on the first measurement indication; and/or, the UE may obtain the measurement result of the frequency point measured in the measurement frequency point list based on the second measurement indication.

For example, if the measurement indication obtained by the UE includes the first measurement indication and the second measurement indication, the UE may measure the signal quality of the PSCell based on the first measurement indication, to obtain the PSCell measurement result.

Optionally, the UE may also measure the signal quality of other SCells in an SCG, to obtain the SCell measurement result in the SCG.

The UE may obtain the measurement result of the frequency point measured in the measurement frequency point list based on the second measurement indication. If the measurement frequency point list is that in measurement configuration when the UE is in the connected state, that is, the network side instructs the UE to maintain the measurement configuration in the connected state, the UE may perform measurement based on the measurement frequency point list to obtain the measurement result of the frequency point measured in the measurement frequency point list, such as, obtain a signal quality or a load, etc. of different cells in the measurement frequency point.

It should be noted that only one of S161 and S162 may be executed, or S161 may be executed preferentially, or both steps may be executed. This is not limited in the present disclosure.

Figure 9:
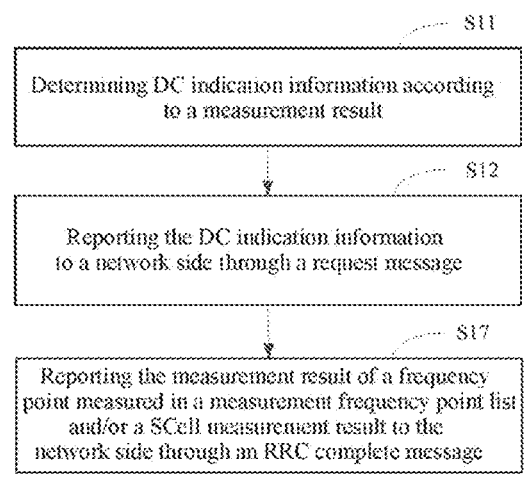
FIG. 9 illustrates a flow chart of the measuring method in dual connectivity (DC) operation based on an embodiment of the present disclosure.

FIG. 9 illustrates a flow chart of the measuring method in dual connectivity (DC) operation based on an embodiment of the present disclosure. As shown in FIG. 9, optionally, the method may further include:

S17: reporting the measurement result of the frequency point measured in the measurement frequency point list and/or the SCell measurement result to the network side through an RRC complete message.

In an example, the UE may judge whether the measurement result includes the measurement result of the frequency point measured in the measurement frequency point list as well as whether the measurement result includes the SCell measurement result. If the measurement result includes the measurement result of the frequency point, a first measurement result that is larger than the frequency point measurement threshold, among the measurement results of the frequency points measured in the measurement frequency point list, can be determined, and the first measurement result may be reported through the RRC complete message; and If the measurement result includes the SCell measurement result, the UE may determine the SCell measurement result satisfying the SCell threshold or the SCG cell threshold as the first SCell measurement result, and the first SCell measurement result may be reported through the RRC complete message.

The first SCell measurement result may be used for the network side to schedule the SCell. For example, the network side may schedule preferentially the cell with good signal quality; and the first measurement result may be used when the network side cannot resume the PSCell, for example, when the DC indication reported by the UE to the network side is an indication that the PSCell does not satisfy the PSCell threshold or the DC indication being null, the network side cannot resume the previous DC configuration of the UE directly, so that the UE can determine the PSCell based on the first measurement result, and the DC configuration can be performed for the UE. The RRC complete message may be an RRCResumeComplete message.

The first measurement result and the first SCell measurement result may comprise ID information of cells or beams satisfying the conditions (such as satisfying the frequency point measurement threshold, the SCell threshold or the SCG cell threshold), and may further contain the measured signal intensity information of the cells and/or the measured signal intensity information of the beams.

Optionally, the measurement result of the frequency point measured in the measurement frequency point list and/or the SCell measurement result includes a combination of a PCI and a frequency point of the cell.

If a plurality of cells in the network share one physical cell identity (PCI), a unique identity of the cell, such as PSCell, may be the PCI plus the frequency point (the combination of the PCI and the frequency point), so that the network side and the UE can distinguish different PSCells. The reported measurement result of the frequency point and/or the reported SCell measurement result may include the combination of the PCI and the frequency point of the cell, so that the network side distinguishes which cell the measurement result of the frequency point and/or the SCell measurement result belongs to.

Figure 10:
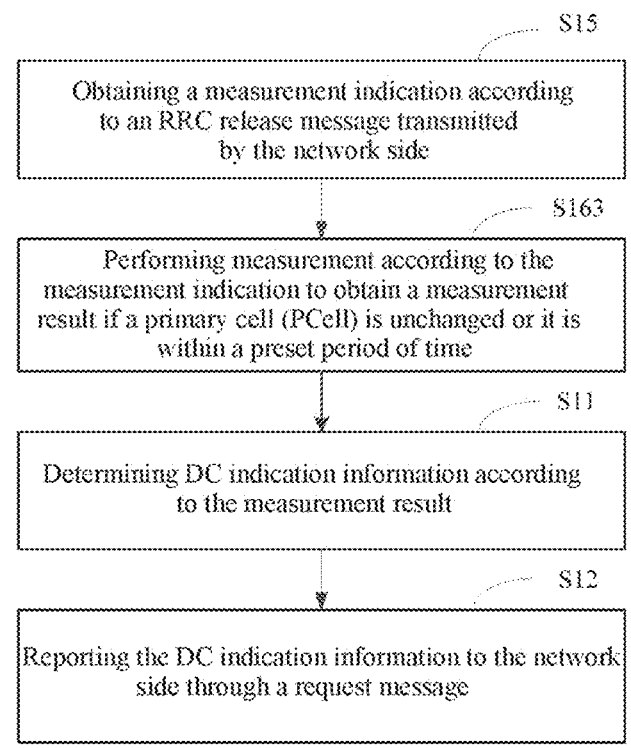
FIG. 10 illustrates a flow chart of the measuring method in dual connectivity (DC) operation based on an embodiment of the present disclosure.

FIG. 10 illustrates a flow chart of the measuring method in dual connectivity (DC) operation based on an embodiment of the present disclosure. As shown in FIG. 10, optionally. S16 may further include:

S163: performing measurement based on the measurement indication to obtain the measurement result if a primary cell (PCell) is unchanged or it is within a preset period of time.

The preset period of time may be preset by the UE. A start point of the preset period of time may be a point of time when the UE enters a non-connected state. A terminal point of the preset period of time may be any point of time before the UE initiates RA.

Prior to S161, the UE may judge whether the PCell is changed or whether it is within the preset period of time. If the primary cell (PCell) is unchanged or it is within the preset period of time, measurement may be performed based on the measurement indication to obtain the measurement result.

Optionally, if the primary cell (PCell) of the UE has been changed, or it is not within the preset period of time, the UE may not perform any measurement and may maintain cell reselection criterions for the existing UE in the non-connected state.

The UE judges whether the PCell is changed or whether it is within the preset period of time before the measurement, so that electric energy of the UE in the non-connected state is saved.

Figure 11:
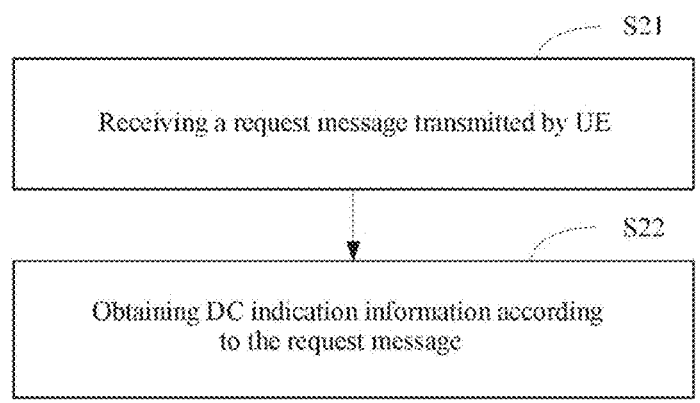
FIG. 11 illustrates a flow chart of the measuring method in dual connectivity (DC) operation based on an embodiment of the present disclosure.

FIG. 11 illustrates a flow chart of the measuring method in dual connectivity (DC) operation based on an embodiment of the present disclosure. The method may be applied to a network side, such as gNB. As shown in FIG. 7, the method may include:

S21: performing a request message transmitting by UE; and

S22: obtaining DC indication information based on the request message.

The request message may be an RRC setup request message RRCSetupRequest message or an RRC resume request message. The RRC resume request message may include an RRCResumeRequest message or an RRCResumeRequest1 message. The UE may be UE in the non-connected state. The non-connected state includes an inactive state or an idle state.

The network side may receive the request message transmitted by the UE and may obtain the DC indication information based on the request message, such as an indication of resuming DC. The network side may resume the previous DC configuration of the UE directly based on the indication of resuming the DC.

The network side obtains the DC indication information by receiving the RRC request message transmitted by the UE, so as to perform DC configuration. The measuring method in the dual connectivity (DC) operation based on the embodiments of the present disclosure can perform DC configuration for the UE based on the DC indication information when the UE is in the non-connected state, thereby quickly resuming or configuring the DC configuration of the UE.

Optionally, the DC indication information includes one of the following: an indication of resuming a secondary cell group (SCG), an indication of resuming DC configuration, an indication that a primary SCG cell (PSCell) satisfies a PSCell threshold, an indication that the PSCell does not satisfy the PSCell threshold, an indication that the PSCell satisfies an SCG cell threshold, and an indication that an SCG cell satisfies the threshold.

Figure 12:
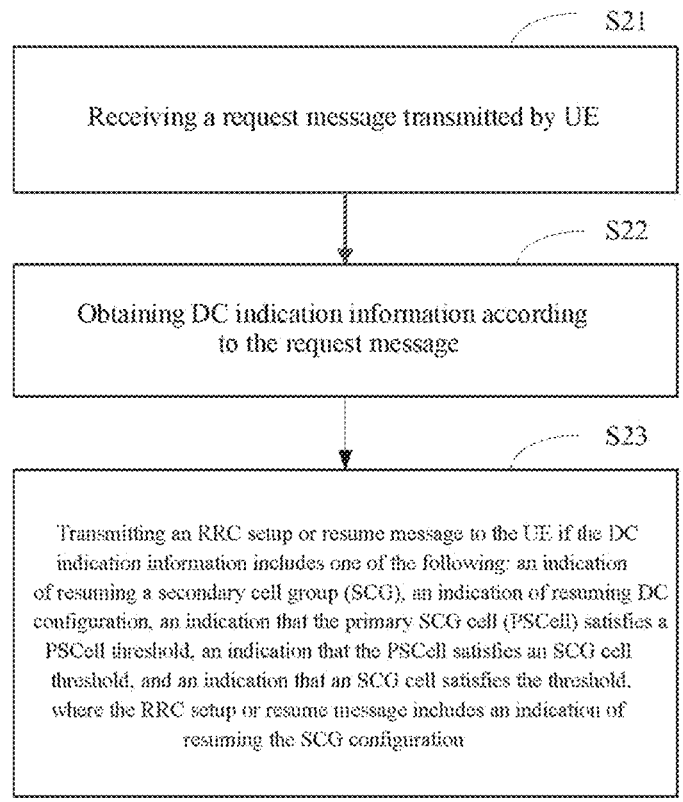
FIG. 12 illustrates a flow chart of the measuring method in dual connectivity (DC) operation based on an embodiment of the present disclosure.

FIG. 12 illustrates a flow chart of the measuring method in dual connectivity (DC) operation based on an embodiment of the present disclosure. As shown in FIG. 12, optionally, the method may further include:

S23: transmitting an RRC setup or resume message to the UE to instruct the UE to resume the SCG configuration so as to enter a DC state if the DC indication information includes one of the following: an indication of resuming a secondary cell group (SCG), an indication of resuming DC configuration, an indication that the primary SCG cell (PSCell) satisfies a PSCell threshold, an indication that the PSCell satisfies an SCG cell threshold, and an indication that an SCG cell satisfies the threshold, where the RRC setup or resume message includes an indication of resuming the SCG configuration.

If the DC indication information includes the indication of resuming DC SCG or the indication that the PSCell satisfies the PSCell threshold, which illustrates that the previous PSCell of the UE still satisfies the conditions, that is, the previous PSCell of the UE may continue to be used, then the network side may transmit the RRC setup or resume message to the UE. The RRC setup or resume message may include the indication of resuming SCG configuration to instruct the UE to resume the SCG configuration so as to enter the DC state.

Figure 13:
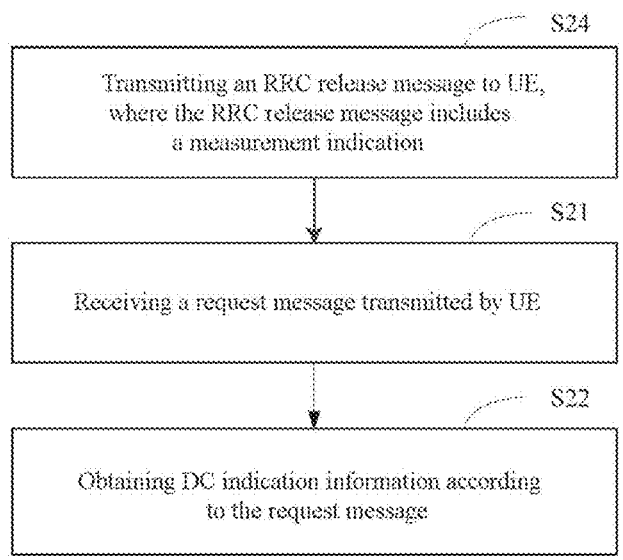
FIG. 13 illustrates a flow chart of the measuring method in dual connectivity (DC) operation based on an embodiment of the present disclosure.

FIG. 13 illustrates a flow chart of the measuring method in dual connectivity (DC) operation based on an embodiment of the present disclosure. As shown in FIG. 13, optionally, the method may further include:

S24: transmitting an RRC release message to UE, where the RRC release message includes a measurement indication;

The measurement indication is used for the UE in the non-connected state to obtain a measurement result so as to report one or more of the following based on the measurement result: DC indication information, a measurement result of a frequency point measured in the measurement frequency point list or an SCell measurement result.

The network side may set the measurement indication and transmit the measurement indication to the UE through an RRC release message, so that the UE can measure cells or frequency points based on the measurement indication when being in the non-connected state, such as measure the PSCell; and the UE can perform corresponding reporting during a random access procedure, so that measurement reporting becomes quicker, and the network side can accelerate resuming of the DC configuration of the UE.

Optionally, the measurement indication may include a first measurement indication and/or a second measurement indication;

The first measurement indication includes one or more of the following: an indication of reserving SCG configuration, an indication of reserving secondary cell (SCell) configuration, a PSCell threshold, an SCell threshold, and an SCG cell threshold; and the second measurement indication includes a measurement frequency point list and a frequency point measurement threshold.

Optionally, the first measurement indication and the second measurement indication further include threshold offset information.

Optionally, the measurement frequency point list and the frequency point measurement threshold are those configured in measurement configuration when the UE is in the connected state;

or the measurement frequency point list and the frequency point measurement threshold are those newly configured by the network side.

The above is merely an example of the measurement indication set by the network side, and this is not limited in the present disclosure, as long as the measurement indication set by the network side can enable the UE to perform measurement when being in the non-connected state so as to perform a report based on the measurement result during random access so as to quickly realize the DC configuration of the UE.

Optionally, the measurement result may include one or more of the following: a PSCell measurement result, an SCell measurement result, and a measurement result of a frequency point measured in the measurement frequency point list;

The PSCell measurement result and the SCell measurement result are measured by the UE in the non-connected state based on the first measurement indication; and The measurement result of the frequency point measured in the measurement frequency point list is measured by the UE in the non-connected state based on the second measurement indication.

Figure 14:
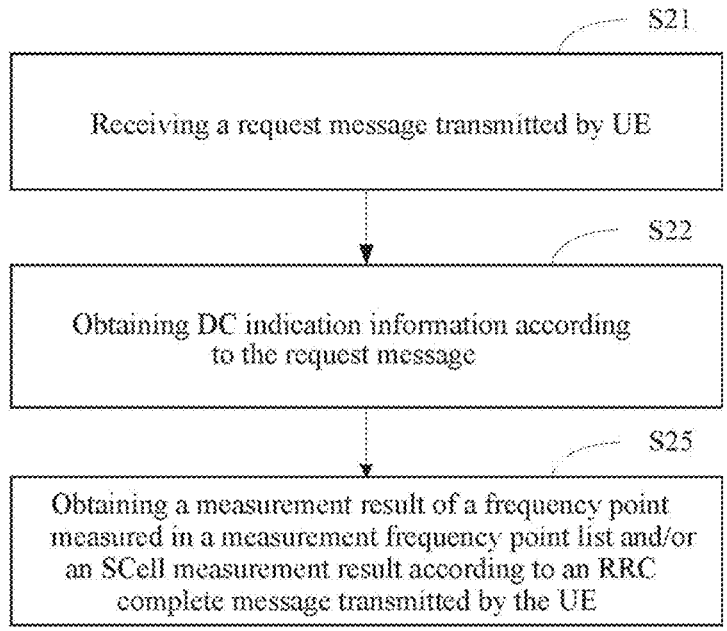
FIG. 14 illustrates a flow chart of the measuring method in dual connectivity (DC) operation based on an embodiment of the present disclosure.

FIG. 14 illustrates a flow chart of the measuring method in dual connectivity (DC) operation based on an embodiment of the present disclosure. As shown in FIG. 14, Optionally, the method may further include:

S25: obtaining the measurement result of the frequency point measured in the measurement frequency point list and/or the SCell measurement result based on an RRC complete message transmitted by the UE.

The network side may obtain the measurement result of the frequency point measured in the measurement frequency point list and/or the SCell measurement result according tobased on the RRC complete message transmitted by the UE. The network side may choose the way of utilizing the measurement result of the frequency point measured in the measurement frequency point list and/or the SCell measurement result based on the DC indication information to perform DC configuration on the UE.

In an example, the obtained measurement result of the frequency point measured in the measurement frequency point list and the obtained SCell measurement result may include ID information of cells or beams satisfying the conditions (such as satisfying the frequency point measurement threshold, the SCell threshold or the SCG cell threshold), and may further contain the measured signal intensity information of the cells and/or the measured signal intensity information of the beams. If the DC indication information includes one of the following: an indication of resuming a secondary cell group (SCG), an indication of resuming DC configuration, an indication that a primary SCG cell (PSCell) satisfies a PSCell threshold, an indication that the PSCell satisfies an SCG cell threshold, and an indication that an SCG cell satisfies the threshold, then the network side may adjust the secondary cell (SCell) in the secondary cell group (SCG) based on the obtained measurement result of the frequency point measured in the measurement frequency point list; or the network side may schedule the SCell based on the obtained SCell measurement result, for example, the network side may preferentially schedule the cell with good signal quality.

If the network side judges that the DC indication information includes the indication that the PSCell does not satisfy the PSCell threshold or the DC indication being null, then the network side may learn that the previous DC configuration of the UE is unavailable, and the network side may determine the PSCell based on the obtained measurement result of the frequency point measured in the measurement frequency point list.

Optionally, the measurement result of the frequency point measured in the measurement frequency point list and/or the SCell measurement result may include a combination of a PCI and a frequency point of the cell. If a plurality of cells in the network share one physical cell identity (PCI), a unique identity of the cell may be the combination of the PCI and the frequency point.

It should be noted that the measuring method in DC operation according based on the present disclosure is also applicable to a measuring method in carrier aggregation (CA) operation. The network side may also transmit the measurement indication to the UE in the RRC release message when the UE migrates from the connected state to the non-connected state, and the UE may perform measurement based on the measurement indication when being in the non-connected state and/or during the RACH procedure, and may determine CA indication information based on the measurement result. The UE may report the CA indication information in the request message when initiating the random access procedure, and may also report the measurement results of other cells (including the SCell) or frequency points in the RRC complete message. This may enable the network side to resume the CA operation of the UE quickly.

In the measurement of the CA operation, since there is no PSCell in CA, the measurement indication of the network side only needs to include an SCell configuration indication and an SCell threshold, or the measurement indication of the network side may include a measurement frequency point list and a frequency point measurement threshold.

For the measurement indication of the network side including the measurement frequency point list and the frequency point measurement threshold, the UE may obtain the measurement result based on the measurement frequency point list so as to report the measurement result satisfying the frequency point measurement threshold to the network side. The network side may determine that CA operation or DC operation needs to be configured, based on whether the cells in the measurement result are in a same base station. For example, if the cells in the measurement result are all in the same base station, it may be determined that the UE needs to configure the CA operation; and if the cells in the measurement result are not in the same base station, it may be determined that the UE needs to configure the DC operation. This is merely an example of configuring DC or CA by the network side, which is not limited in the present disclosure.

Figure 15:
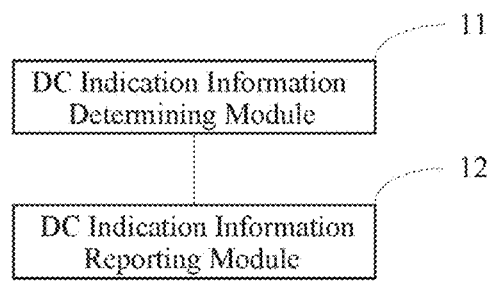
FIG. 15 illustrates a block diagram of a measuring device in dual connectivity (DC) operation based on an embodiment of the present disclosure.

FIG. 15 illustrates a block diagram of a measuring device in dual connectivity (DC) operation based on an embodiment of the present disclosure. As shown in FIG. 15, the device may include:

a DC indication information determining module 11, configured to determine DC indication information based on a measurement result; and a DC indication information reporting module 12, configured to report the DC indication information to a network side through a request message.

The DC indication information can be determined and reported by the UE in the non-connected state based on the measurement result. The quick measurement and report are realized through the measuring device in dual connectivity (DC) operation based on the embodiments of the present disclosure. Moreover, when the DC indication information indicates that DC configuration can be resumed, the network side may resume the previous DC configuration of the UE directly, thereby resuming the DC configuration of the UE quickly.

Optionally, the DC indication information may include one of the following: an indication of resuming a secondary cell group (SCG), an indication of resuming DC configuration, an indication that a primary SCG cell (PSCell) satisfies a PSCell threshold, an indication that the PSCell does not satisfy the PSCell threshold, a DC indication being null, an indication that the PSCell satisfies an SCG cell threshold, and an indication that an SCG cell satisfies the threshold.

Figure 16:
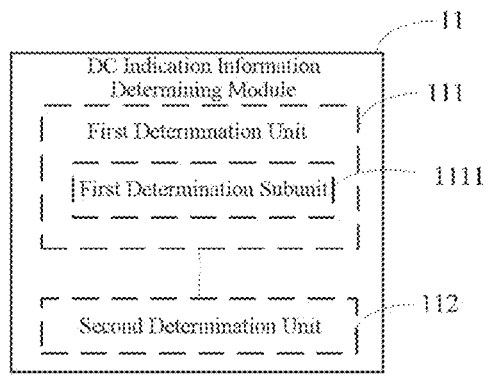
FIG. 16 illustrates a block diagram of a DC indication information determining module 11 based on an embodiment of the present disclosure.

FIG. 16 illustrates a block diagram of a DC indication information determining module 11 based on an embodiment of the present disclosure. As shown in FIG. 16, Optionally, the DC indication information determining module 11 may include:

a first determination unit 111, configured to determine DC indication information based on a relationship between a PSCell measurement result and the PSCell threshold or the SCG cell threshold if the measurement result includes the PSCell measurement result; and a second determination unit 112, configured to determine the DC indication information as the DC indication being null if the measurement result does not include the PSCell measurement result.

As shown in FIG. 16, Optionally, the first determination unit 111 may include:

a first determination subunit 1111, configured to determine, if the PSCell measurement result satisfies the PSCell threshold or the SCG cell threshold, the DC indication information as one of the following: the indication of resuming the secondary cell group (SCG), the indication of resuming DC configuration, the indication that the primary SCG cell (PSCell) satisfies the PSCell threshold, the indication that the PSCell satisfies the SCG cell threshold, and the indication that an SCG cell satisfies the threshold.

Figure 17:
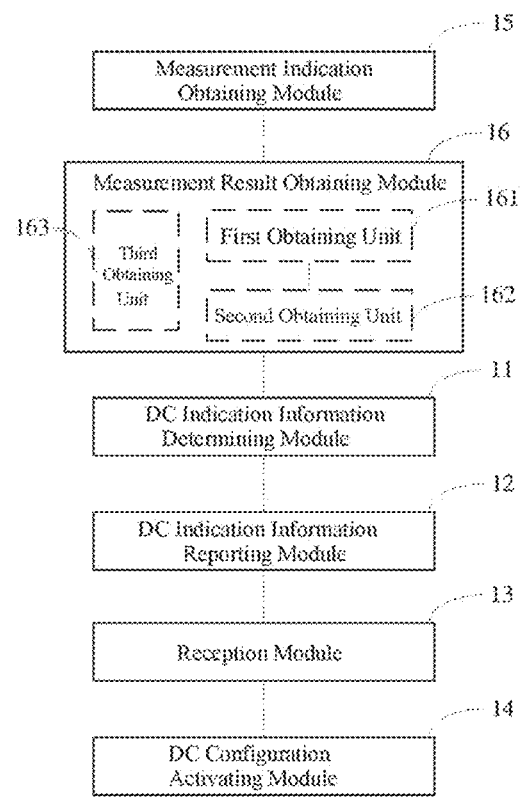
FIG. 17 illustrates a block diagram of the measuring device in dual connectivity (DC) operation based on an embodiment of the present disclosure.

FIG. 17 illustrates a block diagram of the measuring device in dual connectivity (DC) operation based on an embodiment of the present disclosure. As shown in FIG. 17, Optionally, the device may include:
- a reception module 13, configured to receive an RRC setup or resume message transmitted by the network side, where the RRC setup or resume message includes an indication of resuming SCG configuration; and
- a DC configuration activating module 14, configured to activate the DC configuration based on the indication of resuming the SCG configuration.

As shown in FIG. 17, Optionally, the device may include:
- a measurement indication obtaining module 15, configured to obtain a measurement indication based on an RRC release message transmitted by the network side; and
- a measurement result obtaining module 16, configured to perform measurement based on the measurement indication to obtain the measurement result.

Optionally, the measurement result obtaining module 16 may be further configured to start co-frequency and/or hetero-frequency measurement based on the measurement indication to obtain the measurement result when the UE initiates a random access procedure.

As shown in FIG. 17, Optionally, the measurement result obtaining module 16 may include:
- a first obtaining unit 161, configured to obtain the PSCell measurement result and/or the SCell measurement result based on a first measurement indication; and
- a second obtaining unit 162, configured to obtain a measurement result of a frequency point measured in the measurement frequency point list based on a second measurement indication.

As shown in FIG. 17, Optionally, the measurement result obtaining module 16 may further include:
- a third obtaining unit 163, configured to perform measurement based on the measurement indication to obtain the measurement result if a primary cell (PCell) is unchanged or it is within a preset period of time, wherein a start point of the preset period of time is a point of time when UE enters the non-connected state.

Optionally, the measurement indication may include a first measurement indication and/or a second measurement indication;

The first measurement indication includes one or more of the following: an indication of reserving SCG configuration, an indication of reserving secondary cell (SCell) configuration, a PSCell threshold, an SCell threshold, and an SCG cell threshold; and The second measurement indication includes a measurement frequency point list and/or a frequency point measurement threshold.

Optionally, the first measurement indication and the second measurement indication may further include threshold offset information.

Optionally, the measurement frequency point list and/or the frequency point measurement threshold is that configured in measurement configuration when the UE is in the connected state;
or
the measurement frequency point list and the frequency point measurement threshold are those newly configured by the network side.

Figure 18:
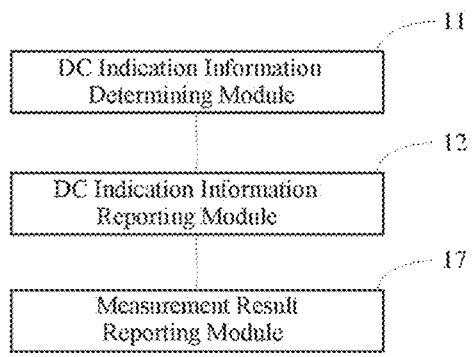
FIG. 18 illustrates a block diagram of the measuring device in dual connectivity (DC) operation based on an embodiment of the present disclosure.

FIG. 18 illustrates a block diagram of the measuring device in dual connectivity (DC) operation based on an embodiment of the present disclosure. As shown in FIG. 18, Optionally, the device may include:
- a measurement result reporting module 17, configured to report a measurement result of a frequency point measured in the measurement frequency point list and/or an SCell measurement result to the network side through an RRC complete message.

Optionally, the measurement result of the frequency point measured in the measurement frequency point list and/or the SCell measurement result includes a combination of a PCI and a frequency point of the cell.

Figure 19:
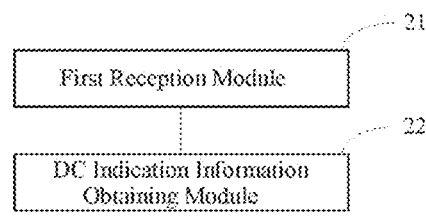
FIG. 19 illustrates a block diagram of the measuring device in dual connectivity (DC) operation based on an embodiment of the present disclosure.

FIG. 19 illustrates a block diagram of the measuring device in dual connectivity (DC) operation based on an embodiment of the present disclosure. As shown in FIG. 19, the device may include:
- a first reception module 21, configured to receive a request message transmitted by UE; and
- a DC indication information obtaining module 22, configured to obtain DC indication information based on the request message.

The network side obtains the DC indication information through the RRC request message transmitted by the UE, so as to perform DC configuration. The measuring device in the dual connectivity (DC) operation based on the embodiments of the present disclosure can perform the DC configuration on the UE based on the DC indication information, thereby resuming or configuring the DC configuration of the UE quickly.

Optionally, the DC indication information includes one of the following: an indication of resuming a secondary cell group (SCG), an indication of resuming DC configuration, an indication that a primary SCG cell (PSCell) satisfies a PSCell threshold, an indication that the PSCell does not satisfy the PSCell threshold, an indication that the PSCell satisfies an SCG cell threshold, and an indication that an SCG cell satisfies the threshold.

Figure 20:
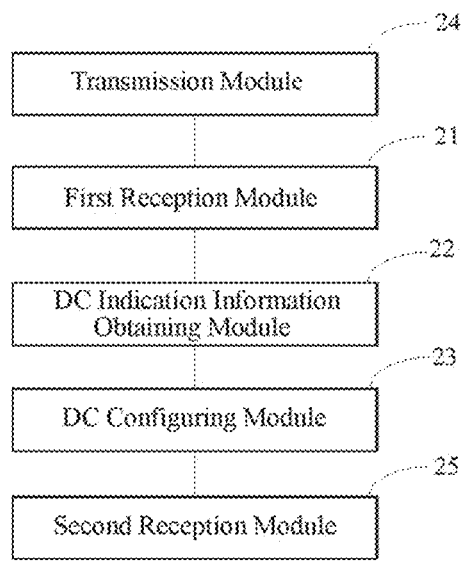
FIG. 20 illustrates a block diagram of the measuring device in dual connectivity (DC) operation based on an embodiment of the present disclosure.

FIG. 20 illustrates a block diagram of the measuring device in dual connectivity (DC) operation based on an embodiment of the present disclosure. As shown in FIG. 20, Optionally, the device may further include:
- a DC configuring module 23, configured to transmit an RRC setup or resume message to the UE to instruct the UE to resume the SCG configuration so as to enter the DC state if the DC indication information includes one of the following: the indication of resuming the secondary cell group (SCG), the indication of resuming the DC configuration, the indication that the primary SCG cell (PSCell) satisfies the PSCell threshold, the indication that the PSCell satisfies the SCG cell threshold, and the indication that the SCG cell satisfies the threshold, where the RRC setup or resume message includes an indication of resuming SCG configuration.

As shown in FIG. 20, Optionally, the device may further include:
- a transmission module 24, configured to transmit an RRC release message to the UE, where the RRC release message includes a measurement indication; and The measurement indication is used for the UE in the non-connected state to obtain the measurement result so as to report one or more of the following based on the measurement result: DC indication information, the measurement result of the frequency point measured in the measurement frequency point list or the SCell measurement result.

As shown in FIG. 20, Optionally, the device may further include:
- a second reception module 25, configured to obtain the measurement result of the frequency point measured in the measurement frequency point list and/or the SCell measurement result based on the RRC complete message transmitted by the UE.

Optionally, the measurement indication may include a first measurement indication and/or a second measurement indication;
  the first measurement indication includes one or more of the following: an indication of reserving SCG configuration, an indication of reserving secondary cell (SCell) configuration, a PSCell threshold, an SCell threshold, and an SCG cell threshold; and
  the second measurement indication includes a measurement frequency point list and/or a frequency point measurement threshold.

Optionally, the first measurement indication and the second measurement indication may further include threshold offset information.

Optionally, the measurement frequency point list and/or the frequency point measurement threshold is that configured in measurement configuration when the UE is in the connected state; or
  the measurement frequency point list and the frequency point measurement threshold are a measurement frequency point list and a frequency point measurement threshold newly configured by the network side.

Optionally, the measurement result may include one or more of the following: a PSCell measurement result, an SCell measurement result, and a measurement result of a frequency point measured in the measurement frequency point list;
  wherein the PSCell measurement result and the SCell measurement result are measured by the UE in the non-connected state based on the first measurement indication; and
  the measurement result of the frequency point measured in the measurement frequency point list is measured by the UE in the non-connected state based on the second measurement indication.

Optionally, the measurement result of the frequency point measured in the measurement frequency point list and/or the SCell measurement result includes a combination of a PCI and a frequency point of the cell.

Figure 21:
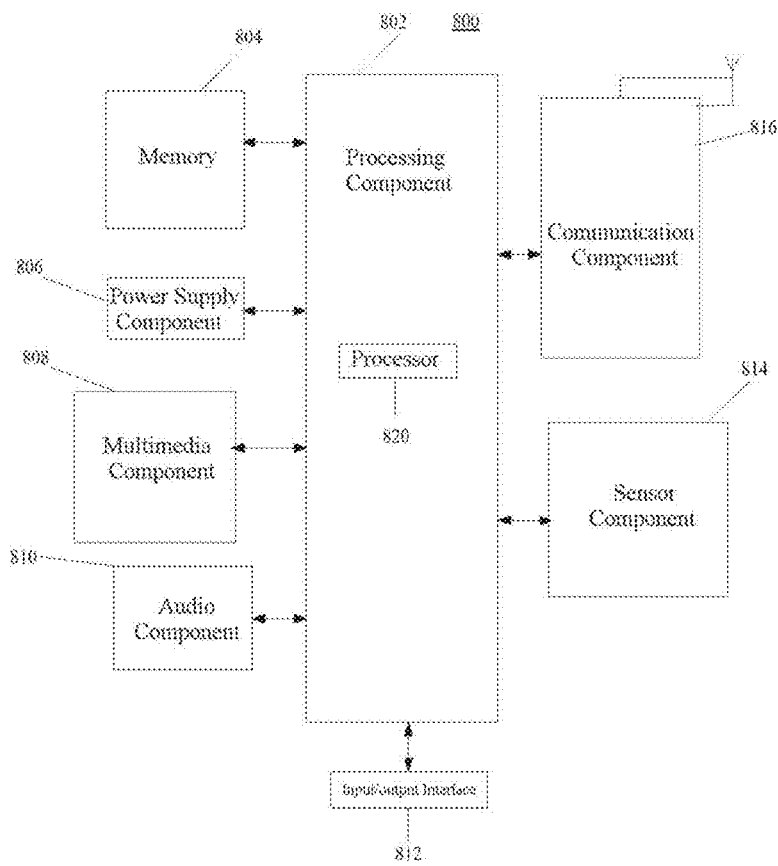
FIG. 21 is a block diagram illustrating a measuring device 800 in dual connectivity (DC) operation based on an exemplary embodiment.

FIG. 21 is a block diagram illustrating a device 800 for the measuring device in dual connectivity (DC) operation based on an exemplary embodiment. For example, the device 800 may be a mobile phone, a computer, a digital broadcast terminal, a message transceiver, a game console, a tablet device, medical equipment, fitness equipment, a personal digital assistant, etc.

Referring to FIG. 21, the device 800 may comprise one or more of the following components: a processing component 802, a memory 804, a power supply component 806, a multimedia component 808, an audio component 810, an input/output (I/O) interface 812, a sensor component 814 and a communication component 816.

The processing component 802 generally controls the overall operation of the device 800, such as operations associated with display, phone call, data communication, camera operation and record operation. The processing component 802 may comprise one or more processors 820 to execute instructions, in order to complete all or some steps of the above method. Furthermore, the processing component 802 may comprise one or more modules that facilitate interactions between the processing component 802 and other components. For example, the processing component 802 may comprise a multimedia module to facilitate the interaction between the multimedia component 808 and the processing component 802.

The memory 804 is configured to store various types of data to support the operations of the device 800. Examples of these data include instructions for any application program or method operated on the device 800, contact data, telephone directory data, messages, pictures, videos, etc. The memory 804 may be any type of volatile or non-volatile storage devices or a combination thereof, such as static random access memory (SRAM), electronic erasable programmable read-only memory (EEPROM), erasable programmable read-only memory (EPROM), programmable read-only memory (PROM), read-only memory (ROM), magnetic memory, flash memory, magnetic disk or compact disk.

The power supply component 806 supplies electric power to various components of the device 800. The power supply component 806 may comprise a power supply management system, one or more power supplies, and other components associated with generation, management and distribution of power for the device 800.

The multimedia component 808 includes a screen providing an output interface between the device 800 and a user. In some embodiments, the screen may comprise a liquid crystal display (LCD) and a touch panel (TP). If the screen includes the touch panel, the screen may be implemented as a touch screen to receive an input signal from the user. The touch panel includes one or more touch sensors to sense touch, sliding, and gestures on the touch panel. The touch sensor may not only sense the boundary of a touch or sliding action, but also detect the duration and pressure related to the touch or sliding operation. In some embodiments, the multimedia component 808 includes a front camera and/or a rear camera. When the device 800 is in an operating mode such as a shooting mode or a video mode, the front camera and/or the rear camera may receive external multimedia data. Each of the front camera and the rear camera may be a fixed optical lens system or have a focal length and optical zooming capability.

The audio component 810 is configured to output and/or input an audio signal. For example, the audio component 810 includes a microphone (MIC). When the device 800 is in the operating mode such as a call mode, a record mode and a voice recognition mode, the microphone is configured to receive an external audio signal. The received audio signal may be further stored in the memory 804 or sent via the communication component 816. In some embodiments, the audio component 810 further includes a loudspeaker which is configured to output the audio signal.

The I/O interface 812 provides an interface between the processing component 802 and a peripheral interface module. The above-mentioned peripheral interface module may be a keyboard, a click wheel, buttons, etc. These buttons may include but are not limited to home buttons, volume buttons, start buttons and lock buttons.

The sensor component 814 includes one or more sensors which are configured to provide state evaluation in various aspects for the device 800. For example, the sensor component 814 may detect an on/off state of the device 800 and relative positions of the components, for example the components are a display and a small keyboard of the device 800. The sensor component 814 may also detect a change in the position of the device 800 or of one component of the device 800, presence or absence of a user in contact with the device 800, directions or acceleration/deceleration of the device 800 and a change in the temperature of the device 800. The sensor component 814 may comprise a proximity sensor configured to detect the presence of nearby objects without any physical contact. The sensor component 814 may further comprise an optical sensor such as a CMOS or CCD image sensor which is used in imaging applications. In some embodiments, the sensor component 814 may further comprise an acceleration sensor, a gyroscope sensor, a magnetic sensor, a pressure sensor or a temperature sensor.

The communication component 816 is configured to facilitate the communication in a wired or wireless manner between the device 800 and other devices. The device 800 may access a wireless network based on communication standards, such as WiFi, 2G or 3G, or a combination thereof. In an exemplary embodiment, the communication component 816 receives a broadcast signal or broadcast-related information from an external broadcast management system via a broadcast channel. In an exemplary embodiment, the communication component 816 further includes a near-field communication (NFC) module to promote short-range communication. For example, the NFC module may be implemented on the basis of radio frequency identification (RFID) technology, infrared data association (IrDA) technology, ultrawide band (UWB) technology, Bluetooth (BT) technology and other technologies.

In exemplary embodiments, the device 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, and is used to execute the above method.

In an exemplary embodiment, there is also provided a non-volatile computer readable storage medium, such as memory 804 including computer program instructions. The above computer program instructions may be executed by the processor 820 of the device 800 to implement the above method.

Figure 22:
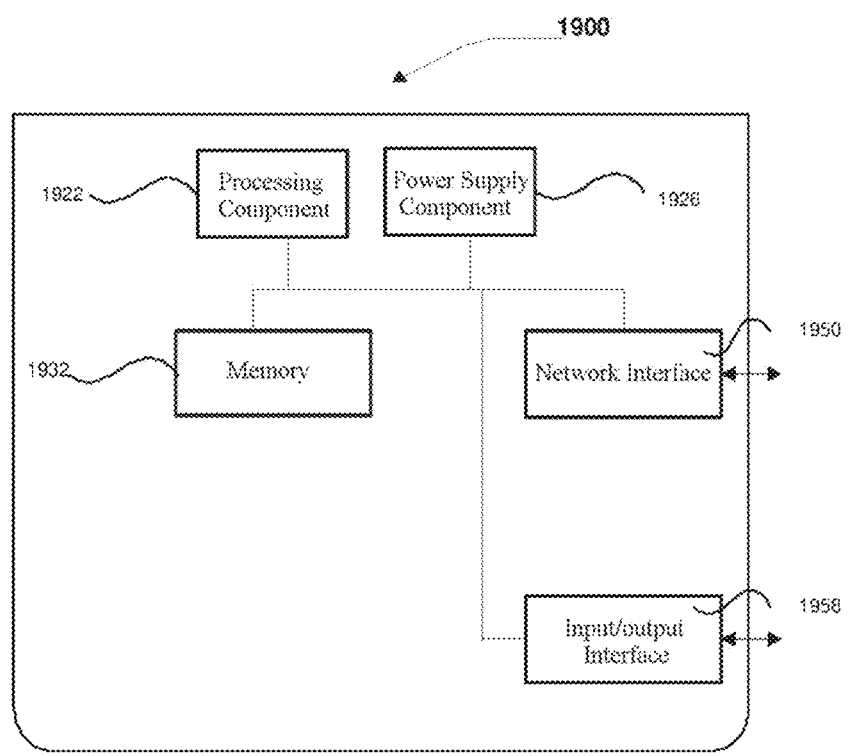
FIG. 22 is a block diagram illustrating a measuring device 1900 in dual connectivity (DC) operation based on an exemplary embodiment.

FIG. 22 is a block diagram illustrating a measuring device 1900 in dual connectivity (DC) operation based on an exemplary embodiment. For example, the device 1900 may be provided as a server. Referring to FIG. 22, the device 1900 includes a processing component 1922, which further includes one or more processors, and memory resources represented by a memory 1932 and configured to store instructions executed by the processing component 1922, such as an application program. The application program stored in the memory 1932 may comprise one or more than one modules each corresponding to a set of instructions. Furthermore, the processing component 1922 is configured to execute the instructions so as to execute the above method.

The device 1900 may further comprise a power supply component 1926 configured to perform power supply management for the device 1900, a wired or wireless network interface 1950 configured to connect the device 1900 to a network, and an input/output (I/O) interface 1958. The device 1900 may operate an operating system stored in the memory 1932, such as Windows Server™, Mac OS X™, Unix™, Linux™, FreeBSD™ or the like.

In an exemplary embodiment, there is also provided a non-volatile computer readable storage medium, such as a memory 1932 including computer program instructions. The above computer program instructions may be executed by the processing component 1922 of the device 1900 to implement the above method.

The present disclosure may be a system, a method, and/or a computer program product. The computer program product may comprise a computer readable storage medium having loaded thereon computer readable program instructions for causing a processor to carry out the various aspects of the present disclosure.

The computer readable storage medium may be a tangible device that may retain and store instructions used by an instruction executing device. The computer readable storage medium may be, but not limited to, e.g., electric storage device, magnetic storage device, optical storage device, electromagnetic storage device, semiconductor storage device, or any proper combination thereof. More specific examples (a non-exhaustive list) of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium used herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein may be downloaded to individual computing/processing devices from a computer readable storage medium or to an external computer or external storage device via network, for example, the Internet, local area network, wide area network and/or wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from state information of the computer readable program instructions, and the electronic circuitry may execute the computer readable program instructions, so as to achieve the various aspects of the present disclosure.

Aspects of the present disclosure have been described herein with reference to the flowchart and/or the block diagrams of the method, device (systems), and computer program product based on the embodiments of the present disclosure. It will be appreciated that each block in the flowchart and/or the block diagram, and combinations of blocks in the flowchart and/or block diagram, may be implemented by the computer readable program instructions.

These computer readable program instructions may be provided to a processor of a general purpose computer, a dedicated computer, or other programmable data processing devices, to produce a machine, such that these instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein includes an article that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable data processing devices or other devices implement the functions/acts specified in one or more blocks in the flowchart and/or block diagram.

The flowcharts and block diagrams in the drawings illustrate the architecture, function, and operation that may be implemented by the system, method and computer program product based on the various embodiments of the present disclosure. In this regard, each block in the flowchart or block diagram may represent a part of a module, a program segment, or a portion of code, which includes one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, may be implemented by dedicated hardware-based systems performing the specified functions or acts, or by combinations of dedicated hardware and computer instructions.

Although the embodiments of the present disclosure have been described above, the above description is merely exemplary, but not exhaustive, and the disclosed embodiments are not limiting. A number of variations and modifications may occur to ordinary skilled in the art without departing from the scopes and spirits of the described embodiments. The terms in the present disclosure are selected to provide the best explanation on the principles and practical applications of the embodiments and the technical improvements to the arts on market, or to make the embodiments disclosed herein understandable to other ordinary skilled in the art.

Optionally, the DC indication information comprises one of the following: an indication of resuming a secondary cell group (SCG), an indication of resuming DC configuration, an indication that a primary SCG cell (PSCell) satisfies a PSCell threshold, an indication that the PSCell does not satisfy the PSCell threshold, a DC indication being null, an indication that the PSCell satisfies an SCG cell threshold, and an indication that an SCG cell satisfies the threshold.

Optionally, the determining DC indication information based on a measurement result includes: determining the DC indication information based on a relationship between a PSCell measurement result and the PSCell threshold or the SCG cell threshold if the measurement result includes the PSCell measurement result: and determining the DC indication information as a DC indication being null if the measurement result does not include the PSCell measurement result.

Optionally, determining the DC indication information based on a relationship between a PSCell measurement result and the PSCell threshold or the SCG cell threshold includes: determining the DC indication information as one of the following if the PSCell measurement result satisfies the PSCell threshold or the SCG cell threshold: the indication of resuming the secondary cell group (SCG), the indication of resuming DC configuration, the indication that the primary SCG cell (PSCell) satisfies the PSCell threshold, the indication that the PSCell satisfies the SCG cell threshold, and the indication that the SCG cell satisfies the threshold.

Optionally, the method further includes: receiving an RRC setup or resume message transmitted by the network side, where the RRC setup or resume message includes an indication of resuming SCG configuration; and activating DC configuration based on the indication of resuming the SCG configuration.

Optionally, the method further includes: obtaining a measurement indication based on an RRC release message transmitted by the network side; and performing measurement based on the measurement indication to obtain the measurement result.

Optionally, the measurement indication includes a first measurement indication and/or a second measurement indication; the first measurement indication includes one or more of the following; an indication of reserving SCG configuration, an indication of reserving secondary cell (SCell) configuration, a PSCell threshold, an SCell threshold, and an SCG cell threshold; and the second measurement indication includes a measurement frequency point list and/or a frequency point measurement threshold.

Optionally, the first measurement indication and the second measurement indication further comprise threshold offset information.

Optionally, the measurement frequency point list and/or the frequency point measurement threshold is that configured in measurement configuration when the UE is in the connected state; or the measurement frequency point list and the frequency point measurement threshold are those newly configured by the network side.

Optionally, performing measurement based on the measurement indication to obtain the measurement result includes: obtaining a PSCell measurement result and/or an SCell measurement result based on the first measurement indication; and/or, obtaining a measurement result of a frequency point measured in the measurement frequency point list based on the second measurement indication.

Optionally, performing measurement based on the measurement indication to obtain the measurement result includes; performing measurement based on the measurement indication to obtain the measurement result if a primary cell (PCell) is unchanged or it is within a preset period of time; wherein a start point of the preset period of time is a point of time when the UE enters a non-connected state.

Optionally, performing measurement based on the measurement indication to obtain the measurement result includes: starting co-frequency and or hetero-frequency measurement to obtain the measurement result when the UE initiates a random access procedure.

Optionally, the method further includes: reporting the measurement result of the frequency point measured in the measurement frequency point list and/or the SCell measurement result to the network side through an RRC complete message.

Optionally, the method includes: the measurement result of the frequency point measured in the measurement frequency point list and/or the SCell measurement result includes a combination of PCI and frequency points of the cell.

Optionally, the DC indication information may include one of the following: an indication of resuming a secondary cell group (SCG), an indication of resuming DC configuration, an indication that a primary SCG cell (PSCell) satisfies a PSCell threshold, an indication that the PSCell does not satisfy the PSCell threshold, an indication that the PSCell satisfies an SCG cell threshold, and an indication that an SCG cell satisfies the threshold.

Optionally, the method further includes: transmitting an RRC setup or resume message to the UE to instruct the UE to resume SCG configuration so as to enter a DC state if the DC indication information includes one of the following; the indication of resuming the secondary cell group (SCG), the indication of resuming DC configuration, the indication that the primary SCG cell (PSCell) satisfies the PSCell threshold, the indication that the PSCell satisfies the SCG cell threshold, and the indication that the SCG cell satisfies the threshold, where the RRC setup or resume message includes an indication of resuming SCG configuration.

Optionally, the method further includes: transmitting an RRC release message to the UE, where the RRC release message includes a measurement indication; and the measurement indication is used for the UE in the non-connected state to obtain the measurement result so as to report one or more of the following based on the measurement result: DC indication information, and a measurement result of a frequency point measured in the measurement frequency point list or an SCell measurement result.

Optionally, the measurement indication includes a first measurement indication and for a second measurement indication; the first measurement indication includes one or more of the following: an indication of reserving SCG configuration, an indication of reserving secondary cell (SCell) configuration, a PSCell threshold, an SCell threshold, and an SCG cell threshold; and the second measurement indication includes a measurement frequency point list and/or a frequency point measurement threshold.

Optionally, the first measurement indication and the second measurement indication further include threshold offset information.

Optionally, the measurement frequency point list and/or the frequency point measurement threshold is that configured in measurement configuration when the UE is in the connected state; or the measurement frequency point list and the frequency point measurement threshold are those newly configured by the network side.

Optionally, the measurement result includes one or more of the following: a PSCell measurement result, an Scell measurement result, and a measurement result of the frequency point measured in the measurement frequency point list; wherein the PSCell measurement result and the SCell measurement result are measured by the UE in the non-connected state based on the first measurement indication; and the measurement result of the frequency point measured in the measurement frequency point list is measured by the UE in the non-connected state based on the second measurement indication.

Optionally, the method includes: obtaining the measurement result of the frequency point measured in the measurement frequency point list and or the SCell measurement result based on an RRC complete message transmitted by the UE.

Optionally, the measurement result of the frequency point measured in the measurement frequency point list and or the SCell measurement result includes a combination of PCI and frequency points of the cell.

According to another aspect of the present disclosure, there is provided a measuring device in dual connectivity (DC) operation. The device is applied to UE in a non-connected state. The device includes: a DC indication information determining module, configured to determine DC indication information based on a measurement result; and a DC indication information reporting module, configured to report the DC indication information to a network side through a request message.

Optionally, the DC indication information includes one of the following: an indication of resuming a secondary cell group (SCG), an indication of resuming DC configuration, an indication that a primary SC G cell (PSCell) satisfies a PSCell threshold, an indication that the PSCell does not satisfy the PSCell threshold, a DC indication being null, an indication that the PSCell satisfies an SCG cell threshold, and an indication that an SCG cell satisfies the threshold.

Optionally, the DC indication information determining module includes: a first determination unit, configured to determine DC indication information based on a relationship between a PSCell measurement result and the PSCell threshold or the SCG cell threshold if the measurement result includes the PSCell measurement result; and a second determination unit, configured to determine the DC indication information as a DC indication being null if the measurement result does not include the PSCell measurement result.

Optionally, the first determination unit includes: a first determination subunit, configured to determine the DC indication information as one of the following if the PSCell measurement result satisfies the PSCell threshold or the SCG cell threshold: the indication of resuming the secondary cell group (SCG), the indication of resuming DC configuration, the indication that the primary SCG cell (PSCell) satisfies the PSCell threshold, the indication that the PSCell satisfies the SCG cell threshold, and the indication that the SCG cell satisfies the threshold.

Optionally, the device further includes: a reception module, configured to receive an RRC setup or resume message transmitted by the network side, where the RRC setup or resume message includes the indication of resuming SCG configuration; and a DC configuration activating module, configured to activate DC configuration based on the indication of resuming the SCG configuration.

Optionally, the device further includes: a measurement indication obtaining module, configured to obtain the measurement indication based on an RRC release message transmitted by the network side; and a measurement result obtaining module, configured to perform measurement based on the measurement indication to obtain the measurement result.

Optionally, the measurement indication includes a first measurement indication and/or a second measurement indication; the first measurement indication includes one or more of the following: an indication of reserving SCG configuration, an indication of reserving secondary cell (SCell) configuration, a PSCell threshold, an SCell threshold, and an SCG cell threshold; and the second measurement indication includes a measurement frequency point list and/or a frequency point measurement threshold.

Optionally, the first measurement indication and the second measurement indication further include threshold offset information.

Optionally, the measurement frequency point list and or the frequency point measurement threshold is that configured in measurement configuration when the UE is in a connected state; or the measurement frequency point list and the frequency point measurement threshold are those newly configured by the network side.

Optionally, the measurement result obtaining module includes: a first obtaining unit, configured to obtain a PSCell measurement result and/or an SCell measurement result based on the first measurement indication; and a second obtaining unit, configured to obtain a measurement result of a frequency point measured in the measurement frequency point list based on the second measurement indication.

Optionally, the measurement result obtaining module includes: a third obtaining unit, configured to perform measurement based on the measurement indication to obtain the measurement result if a primary cell (PCell) is unchanged or it is within a preset period of time; wherein a start point of the preset period of time is a point of time when the UE enters a non-connected state.

Optionally, the measurement result obtaining module is further configured to start co-frequency and or heterofrequency measurement based on a measurement indication to obtain the measurement result when the UE initiates a random access procedure.

Optionally, the device further includes: a measurement result reporting module, configured to report the measurement result of the frequency point measured in the measurement frequency point list and/or the SCell measurement result to the network side through an RRC complete message.

Optionally, the measurement result of the frequency point measured in the measurement frequency point list and/or the SCell measurement result includes a combination of PCI and frequency points of the cell.

According to another aspect of the present disclosure, there is provided a measuring device in dual connectivity (DC) operation, which includes: a first reception module, configured to receive a request message transmitted by UE; and a DC indication information obtaining module, configured to obtain DC indication information based on the request message.

Optionally, the DC indication information includes one of the following: an indication of resuming a secondary cell group (SCG), an indication of resuming DC configuration, an indication that a primary SCG cell (PSCell) satisfies a PSCell threshold, an indication that the PSCell does not satisfy the PSCell threshold, an indication that the PSCell satisfies an SCG cell threshold, and an indication that an SCG cell satisfies the threshold.

Optionally, the device further includes: a DC configuring module, configured to transmit an RRC setup or resume message to the UE to instruct the UE to resume SCG configuration so as to enter a DC state if the DC indication information includes one of the following; the indication of resuming the secondary cell group (SCG), the indication of resuming the DC configuration, the indication that the primary SCG cell (PSCell) satisfies the PSCell threshold, the indication that the PSCell satisfies the SCG cell threshold, and the indication that the SCG cell satisfies the threshold, where the RRC setup or resume message includes an indication of resuming SCG configuration.

Optionally, the device further includes: a transmission module, configured to transmit an RRC release message to the UE, where the RRC release message includes a measurement indication; the measurement indication is used for the UE in the non-connected state to obtain the measurement result and to report one or more of the following based on the measurement result: DC indication information, and a measurement result of a frequency point measured in the measurement frequency point list or an SCell measurement result.

Optionally, the measurement indication includes a first measurement indication and/or a second measurement indication: the first measurement indication includes one or more of the following: an indication of reserving SCG configuration, an indication of reserving secondary cell (SCell) configuration, a PSCell threshold, an SCell threshold, and an SCG cell threshold: and the second measurement indication includes a measurement frequency point list and/or a frequency point measurement threshold.

Optionally, the first measurement indication and the second measurement indication further include threshold offset information.

Optionally, the measurement frequency point list and/or the frequency point measurement threshold is that configured in measurement configuration when the UE is in the connected state; or the measurement frequency point list and the frequency point measurement threshold are those newly configured by the network side.

Optionally, the measurement result includes one or more of the following: a PSCell measurement result, an SCell measurement result, and a measurement result of a frequency point measured in the measurement frequency point list; wherein the PSCell measurement result and the SCell measurement result are measured by the UE in the non-connected state based on the first measurement indication; and the measurement result of the frequency point measured in the measurement frequency point list is measured by the UF in the non-connected state based on the second measurement indication.

Optionally, the device further includes: a second reception module, configured to obtain the measurement result of the frequency point measured in the measurement frequency point list and or the SCell measurement result based on an RRC complete message transmitted by the UE;

Optionally, the measurement result of the frequency point measured in the measurement frequency point list and/or the SCell measurement result includes a combination of PCI and frequency points of the cell. According to another aspect of the present disclosure, there is provided a measuring device in dual connectivity (DC) operation, which includes a processor and a memory configured to store processor executable instructions, wherein the processor is configured to execute the above method.

According to another aspect of the present disclosure, there is provided a non-volatile computer readable storage medium having computer program instructions stored thereon, wherein the computer program instructions, when executed by a processor, implement the above method.

The DC indication information can be determined and reported by the UE in the non-connected state based on the measurement result. Quick measurement and report are realized through the measuring method and device in dual connectivity (DC) operation according to the embodiments of the present disclosure. Moreover, when the DC indication information indicates that DC configuration can be resumed, the network side may resume the previous DC configuration of the UE directly, thereby resuming the DC configuration of the UE quickly.

Other features and aspects of the present disclosure will become apparent from the above detailed description of exemplary embodiments with reference to the accompanying drawings.

What is claimed is:

1. A measuring method in dual-connectivity (DC) operation, wherein the method is applied to user equipment (UE) in a non-connected state, the method comprising:
    determining DC indication information based on the measurement result; and
    reporting the DC indication information to a network side through a request message,
    wherein the DC indication information comprises at least one of the following: an indication of resuming a secondary cell group (SCG), an indication of resuming DC configuration, an indication that a primary SCG cell (PSCell) satisfies a PSCell threshold, an indication that the PSCell does not satisfy the PSCell threshold, a DC indication being null, an indication that the PSCell satisfies an SCG cell threshold, and an indication that an SCG cell satisfies the threshold, and
    wherein said determining DC indication information based on the measurement result comprises determining the DC indication information as the DC indication being null based on the measurement result not comprising a PSCell measurement result.

2. The method according to claim 1, wherein said determining DC indication information based on the measurement result comprises:
    determining the DC indication information based on a relationship between the PSCell measurement result and the PSCell threshold or the SCG cell threshold, based on the measurement result comprising the PSCell measurement result.

3. The method according to claim 2, wherein said determining the DC indication information based on a relationship between a PSCell measurement result and the PSCell threshold or the SCG cell threshold comprises:
    determining, based on the PSCell measurement result satisfying the PSCell threshold or the SCG cell threshold, the DC indication information as at least one of the following: the indication of resuming the secondary cell group (SCG), the indication of resuming DC configuration, the indication that the primary SCG cell (PSCell) satisfies the PSCell threshold, the indication that the PSCell satisfies the SCG cell threshold, and the indication that the SCG cell satisfies the threshold.

4. The method according to claim 3, wherein the method further comprises:
    receiving an RRC setup or resume message transmitted by the network, wherein the RRC setup or resume message comprises an indication of resuming SCG configuration; and
    activating DC configuration based on the indication of resuming the SCG configuration.

5. The method according to claim 1, wherein the method comprises:
    obtaining a measurement indication based on an RRC release message transmitted by the network side; and
    performing measurement based on the measurement indication to obtain the measurement result.

6. The method according to claim 5, wherein the measurement indication comprises a first measurement indication and/or a second measurement indication;
    the first measurement indication comprises one or more of the following: an indication of reserving SCG configuration, an indication of reserving secondary cell (SCell) configuration, a PSCell threshold, an SCell threshold, and an SCG cell threshold; and
    the second measurement indication comprises a measurement frequency point list and/or a frequency point measurement threshold.

7. The method according to claim 6, wherein the measurement frequency point list and/or the frequency point measurement threshold is a measurement frequency point list and/or a frequency point measurement threshold configured in measurement configuration based on the UE being in a connected state; or
    the measurement frequency point list and the frequency point measurement threshold are a measurement frequency point list and a frequency point measurement threshold newly configured by the network side.

8. The method according to claim 6, wherein said performing measurement based on the measurement indication to obtain the measurement result comprises:
    obtaining a PSCell measurement result and/or an SCell measurement result based on the first measurement indication; and/or
    obtaining a measurement result of a frequency point measured in the measurement frequency point list based on the second measurement indication.

9. The method according to claim 8, wherein the method further comprises:
    reporting the measurement result of the frequency point measured in the measurement frequency point list and/or the SCell measurement result to the network side through an RRC complete message.

10. The method according to claim 5, wherein said performing measurement based on the measurement indication to obtain the measurement result comprises:
    performing measurement based on the measurement indication to obtain the measurement result based on a primary cell (PCell) being unchanged or the PCell being within a preset period of time;
    wherein a start point of the preset period of time is a point of time at which the UE enters the non-connected state.

11. The method according to claim 5, wherein said performing measurement based on the measurement indication to obtain the measurement result comprises:
    starting co-frequency and/or hetero-frequency measurement based on the measurement indication to obtain the measurement result based on the UE initiating a random access procedure.

12. A measuring method in dual-connectivity (DC) operation, wherein the method comprises:
    receiving, by a base station, a request message transmitted by a user equipment (UE); and
    obtaining, by the base station, DC indication information based on the request message, wherein the DC indication information comprises at least one of the following: an indication of resuming a secondary cell group (SCG), an indication of resuming DC configuration, an indication that a primary SCG cell (PSCell) satisfies a PSCell threshold, an indication that the PSCell does not satisfy the PSCell threshold, an indication that the PSCell satisfies an SCG cell threshold, and an indication that an SCG cell satisfies a threshold, and wherein the DC indication information comprises the DC indication being null based on a measurement result of a measurement of a cell or a frequency point conducted by the UE while the UE is in a non-connected state not comprising a PSCell measurement result.

13. The method according to claim 12, wherein the method further comprises:
transmitting an RRC setup or resume message to the UE to instruct the UE to resume SCG configuration so as to enter a DC state based on the DC indication information comprising at least one of the following: the indication of resuming the secondary cell group (SCG), the indication of resuming DC configuration, the indication that the primary SCG cell (PSCell) satisfies the PSCell threshold, the indication that the PSCell satisfies the SCG cell threshold, and the indication that the SCG cell satisfies the threshold, wherein the RRC setup or resume message comprises the indication of resuming the SCG configuration.

14. The method according to claim 12, wherein the method further comprises:
transmitting an RRC release message to the UE, wherein the RRC release message comprises a measurement indication;
the measurement indication is used for the UE in a non-connected state to obtain the measurement result so as to report one or more of the following based on the measurement result: DC indication information, a measurement result of a frequency point measured in the measurement frequency point list or an SCell measurement result.

15. The method according to claim 14, wherein the measurement indication comprises a first measurement indication and/or a second measurement indication;
the first measurement indication comprises one or more of the following: an indication of reserving SCG configuration, an indication of reserving secondary cell (SCell) configuration, a PSCell threshold, an SCell threshold, and an SCG cell threshold; and
the second measurement indication comprises a measurement frequency point list and/or a frequency point measurement threshold.

16. The method according to claim 15, wherein the measurement frequency point list and/or the frequency point measurement threshold is the measurement frequency point list and/or the frequency point measurement threshold configured in measurement configuration while the UE is in a connected state; or
the measurement frequency point list and the frequency point measurement threshold are a measurement frequency point list and a frequency point measurement threshold newly configured by the network side.

17. The method according to claim 15, wherein the measurement result comprises one or more of the following: a PSCell measurement result, an SCell measurement result, and a measurement result of a frequency point measured in the measurement frequency point list;
wherein the PSCell measurement result and the SCell measurement result are measured by the UE in the non-connected state based on the first measurement indication; and
the measurement result of the frequency point measured in the measurement frequency point list is measured by the UE in the non-connected state based on the second measurement indication.

18. The method according to claim 15, wherein the method further comprises:
obtaining the measurement result of the frequency point measured in the measurement frequency point list and/or the SCell measurement result based on an RRC complete message transmitted by the UE.

* * * * *